April 16, 1940.  J. T. FAULKNER, JR  2,197,177
WIRE STRETCHER
Filed March 28, 1939   2 Sheets—Sheet 2
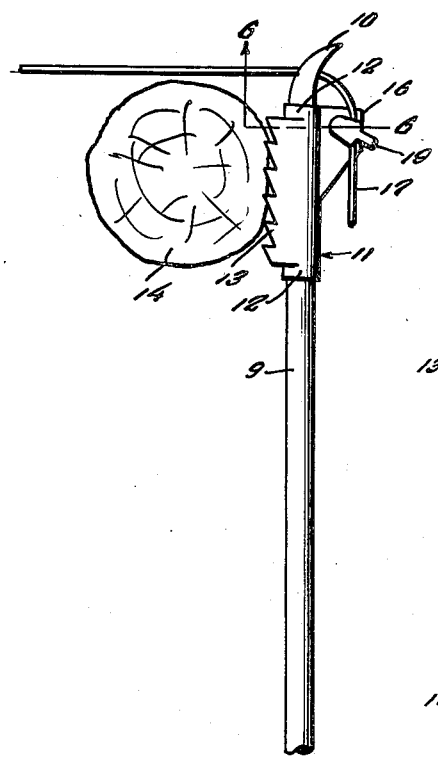
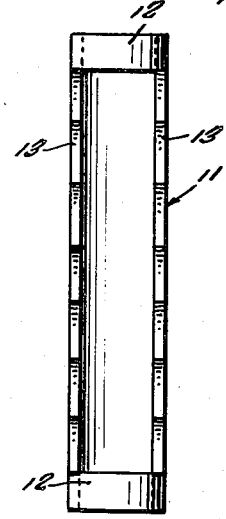
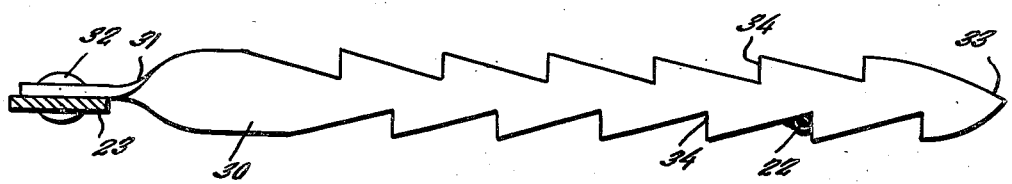
Inventor
J. T. Faulkner, Jr.
By Clarence A. O'Brien
and Hyman Berman
Attorneys Patented Apr. 16, 1940

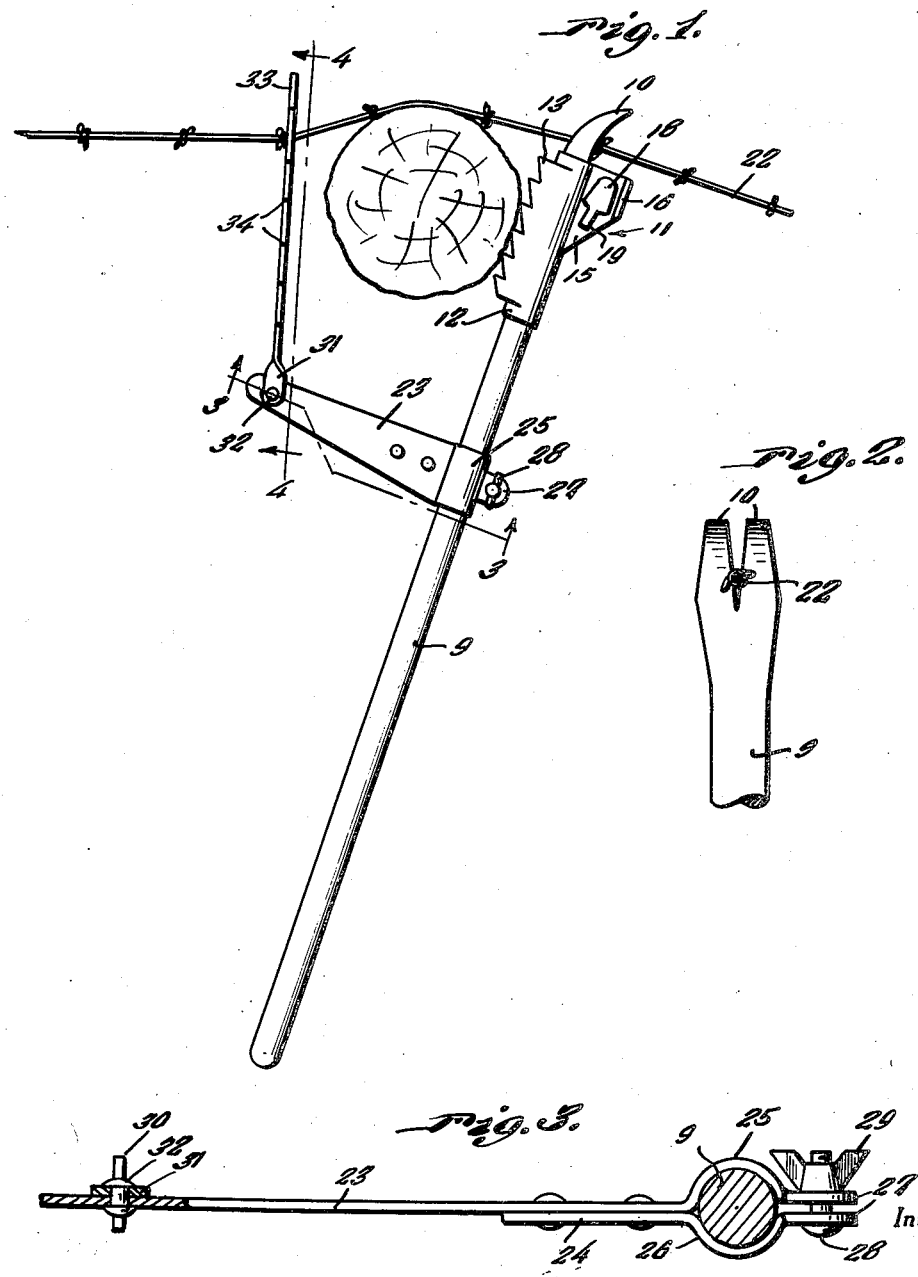

2,197,177

UNITED STATES PATENT OFFICE 2,197,177

WIRE STRETCHER

James T. Faulkner, Jr., Carlton, Tex.

Application March 28, 1939, Serial No. 264,637

5 Claims. (Cl. 140—123.5)

The present invention relates to tools, implements and devices such as are expressly designed and adapted for use in stretching and anchoring both smooth and barbed wire, and the principal object is to structurally improve upon known devices in this same category by providing an assemblage which seems to be more serviceable and aptly fitted for the intended purposes.

I am aware that the wire stretcher art to which the invention relates is quite active and therefore fully developed to the extent of disclosing many different structural arrangements. It follows therefore that the apparent novelty is predicated upon structural distinctions and functional refinements. To this end, one phase of the invention has to do with the adoption and use of a claw bar or lever, this being provided adjacent its claw end with a multiple toothed fulcruming unit, and said unit being provided with wire binding or clamping means.

Further novelty is predicated upon the lever assembly plus a supplementary wire holding arm or finger so arranged and constructed in relation to the lever as to coordinate therewith in mechanically holding the wire and bending it around the post to expedite stapling with a minimum of effort.

Other features and advantages will become more readily apparent from the following description and the accompanying illustrative drawings.

In the drawings, wherein I show the preferred embodiment of the invention and utilize distinguishing reference numerals to differentiate corresponding parts and details:

Figure 1 is a top plan view of the improved multiple purpose tool or implement showing the manner in which it is best used.

Figure 2 is a fragmentary detail of the claw end of the lever member.

Figure 3 is a horizontal section on an enlarged scale taken on the plane of the line 3—3 of Figure 1.

Figure 4 is a detail section, slightly enlarged, taken on the plane of the line 4—4 and looking in the direction of the arrows.

Figure 5 is a plan view of the lever assembly with the auxiliary detent or reach finger omitted, the fence wire in this instance being plain or smooth.

Figure 6 is a section on the line 6—6 of Figure 5.

Figure 7 is a detail section on the line 7—7 of Figure 6.

Figure 8 is an elevational view of the sheath-like toothed fulcrum unit.

Referring now to the drawings by distinguishing reference characters, attention is first invited to the simplified arrangement seen in Figure 5. Here the lever is in the form of a rod 9 of appropriate dimensions and length the outer end thereof being bifurcated to provide a claw. The adapter or fulcrum unit shown thereon is removable. This unit 11 is channel-shaped in major cross-section and provided at opposite ends with ring-like bands or collars 12 to hold it removably and slidably on the rod. The side flanges between the collars 12 are parallel and serrated to provide anti-slipping teeth 13. The teeth are inclined in a direction to permit some sliding of the adapter on the post 14 where slight slippage is required. As shown to advantage in Figures 5, 6 and 7, the sheath-like adapter or fulcrum unit 11 is provided on one side with an outstanding flange 15 having a laterally directed edge 16 forming an abutment for the plain or smooth fence wire 17. Cooperable with the abutment flange is an eccentric clamping member 18 having an operating lever or finger-piece 19. The eccentric has a stud 20 projecting through an aperture in the flange 15 and having its free end headed to effectively assemble the parts 21. With this arrangement the free end of the wire can be clamped between the eccentric 18 and the abutment flange 16. As thus arranged the tool is usable in an obvious manner as depicted in Figure 5 of the drawings.

The modification illustrated in Figure 1 is desirable for use when stretching and nailing or stapling barbed wire 22. The barbs are engaged between the claws as illustrated. The device may be employed as a simple lever with or without the attachment shown in Figure 1. The attachment comprises a bracket 23 having a companion plate 24 riveted thereon as shown in Figure 3. The two plates are bent around the rod as shown at the points 25 and 26. The extension ears 27 accommodate a bolt 28 which in turn is provided with a thumb nut 29. This provides for detachable and slidable mounting of the bracket on the rod. The outer end of the bracket carries the aforementioned reach finger 30. This is in the form of a plate, one end being laterally twisted as at 31 and pivotally riveted at 32 to said bracket 23. The opposite free end of the finger is pointed or of spear-shaped form, as denoted at 33. The longitudinal edges are serrated and the serrations provide detents or shoulders 34 selectively engageable with the wire as brought out to advantage in Figure 1 of the drawings. This finger 30 serves as a check device. It permits the user to take progressive new grips on the lever while preventing back-slipping of the barbed wire. Mainly, however, it cooperates with the lever to pull and bend the wire in close to the post so that it can be held at two longitudinally spaced points to facilitate stapling or nailing. Actual experience with the implement will best disclose the different manners in which this toother finger or detent element 30 can be best utilized.

The form of the invention exhibited in Figure 1 is essentially a one-man structure. That is to say, by catching ahold of the free end of the lever 9 and fulcruming it on the post in a direction from right to left, the wire can be drawn tautly across and against the post. Then the ratchet finger 34 can be placed by hand over the adjacent portion of the wire to bend the wire tightly against the post as is shown. The finger serves to hold the lever in place so that the entire structure as a unit is self-sustained. This facilitates nailing.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. A wire stretcher of the class described comprising a lever, an adapter unit thereon, said unit embodying a sleeve provided with spaced parallel flanges having anti-slipping teeth engageable with a post, said unit being further provided with an outstanding flange including an abutment element and an eccentric clamping member cooperable with the flange and abutment element.

2. As a component part of an assemblage of the class described, an adapter unit comprising a longitudinally elongated body of channel-shaped form provided at opposite ends with ring-like bands to surround a rod, the flanges being parallel and serrated, a third flange formed on said unit and having its outer free end bent laterally to provide an abutment element, and an eccentric provided with a retaining stud, said flange being apertured to permit passage therethrough of said stud, said eccentric having an operating lever.

3. A wire stretcher of the class described comprising a rod having a claw at one end, a toothed fulcrum unit on said rod adjacent said claw, a bracket slidably mounted on said rod and disposed at right angles thereto, a finger pivotally attached to one end of said bracket, said finger having its opposite longitudinal edges serrated to provide a series of selectively usable wire engaging detent elements.

4. A wire stretcher of the class described comprising a rod having a wire engaging claw at one end, a fulcrum unit adjustably mounted on the rod for cooperation with said claw, a bracket shiftably mounted on said rod and disposed laterally in relation thereto, and a toothed finger pivotally attached to one end of said bracket to provide a series of selectively usable wire engaging detent elements.

5. A wire stretcher of the class described comprising a rod having means at one end for engagement with a length of fence wire, a bracket slidably and rotatably mounted on the rod and projecting therefrom at right angles to the longitudinal axis of the rod, and a fence engaging finger pivotally attached to and mounted on said bracket, said finger being provided with a series of selectively usable wire engaging detent elements.

JAMES T. FAULKNER, Jr.